(12) United States Patent
Paul et al.

(10) Patent No.: US 7,584,006 B2
(45) Date of Patent: Sep. 1, 2009

(54) MANAGING MEMORY MODULES

(75) Inventors: Andy Paul, San Francisco, CA (US);
John Beekley, Danville, CA (US); Don Lieberman, San Jose, CA (US); Dan Solvin, Fremont, CA (US); Robert Pearce, Fremont, CA (US); Martin Mueller, Fremont, CA (US)

(73) Assignee: Corsair Memory, Fremont, CA (US)

( * ) Notice: Subject to any disclaimer, the term of this patent is extended or adjusted under 35 U.S.C. 154(b) by 453 days.

(21) Appl. No.: 11/280,563

(22) Filed: Nov. 15, 2005

(65) Prior Publication Data

US 2006/0149960 A1    Jul. 6, 2006

Related U.S. Application Data

(60) Provisional application No. 60/638,304, filed on Dec. 20, 2004.

(51) Int. Cl.
*G05B 15/00* (2006.01)
*G06F 1/24* (2006.01)

(52) U.S. Cl. .................. 700/83; 713/100; 700/299

(58) Field of Classification Search ............ 700/83, 700/11, 299; 713/100, 1; 374/141; 365/212; 714/718, 721, 42
See application file for complete search history.

(56) References Cited

U.S. PATENT DOCUMENTS

| | | | |
|---|---|---|---|
| 6,880,094 B2 * | 4/2005 | LaBerge | 713/300 |
| 7,035,159 B2 * | 4/2006 | Janzen et al. | 365/225.7 |
| 7,120,065 B2 * | 10/2006 | Janzen et al. | 365/189.15 |
| 7,304,905 B2 * | 12/2007 | Hsu et al. | 365/212 |
| 2005/0183069 A1 * | 8/2005 | Cepulis | 717/128 |
| 2006/0265615 A1 * | 11/2006 | Janzen et al. | 713/300 |

* cited by examiner

*Primary Examiner*—Albert DeCady
*Assistant Examiner*—Steven R Garland
(74) *Attorney, Agent, or Firm*—Carina M. Tan; Reed Smith LLP

(57) ABSTRACT

A method and system for managing memory modules or memory devices is disclosed. The memory modules or memory devices are managed by using a microcontroller on the memory module. A user can remotely control the memory module by sending instructions and data to the microcontroller. The microcontroller can cause the measurement of a number of operational parameters of the memory module. The values of the measured operational parameters can be displayed on a display unit that is attached to the memory module or displayed on a screen associated with the host system.

3 Claims, 4 Drawing Sheets

MANAGING MEMORY MODULES

CROSS REFERENCE TO RELATED APPLICATIONS

This application claims the benefit of U.S. Provisional Patent Application No. 60/638,304 filed Dec. 20, 2004, entitled, "PARAMETRIC DISPLAY FOR MEMORY MODULES," by Paul et al., and which is hereby incorporated by reference in its entirety.

TECHNICAL FIELD

The present invention is directed to the use of memory modules, and more specifically to the management of memory modules.

BACKGROUND

The speed of a computer system's memory is one factor that affects computing performance. Technological advances in computer processors' ability to process data have created a demand for faster and faster memory modules. A memory module has associated with it a number of operational parameters such as temperature, voltage and frequency that affect the performance of the memory module.

In view of the foregoing, there is a need for a system and method for monitoring memory modules.

DETAILED DESCRIPTION

Figure 1:
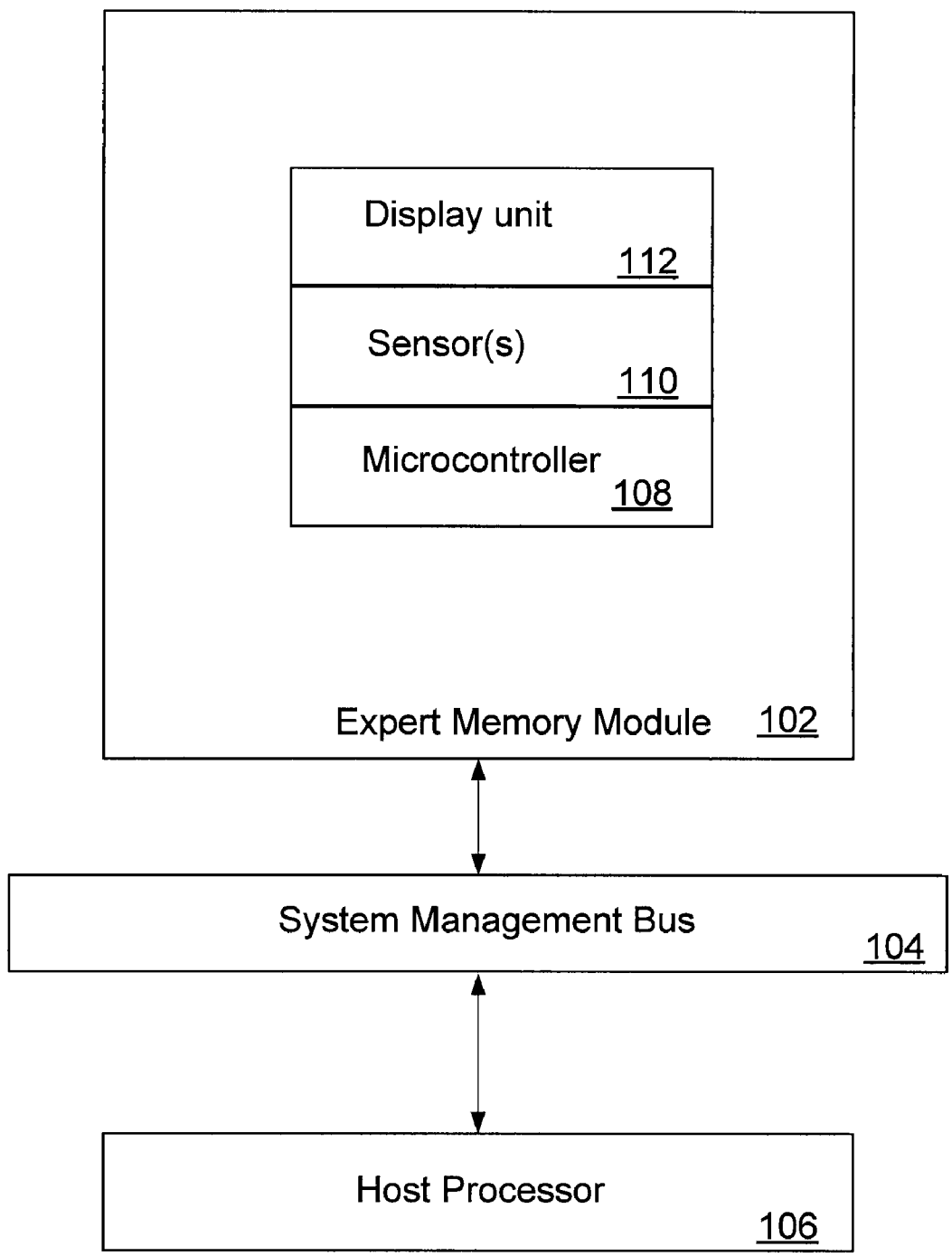
FIG. 1 is a high-level block diagram that illustrates a logical architecture for remotely managing an expert memory module in a host system, according to certain embodiments.

According to certain embodiments, memory modules or memory devices are managed by using a microcontroller on the memory module. Such memory modules or memory devices are herein also referred to as expert memory modules. According to one aspect, a user can remotely control the memory module by sending instructions and data to the microcontroller. According to another aspect, such a microcontroller can cause the measurement of a number of operational parameters of the memory module.

According to another aspect, the values of the measured operational parameters of the memory module can be communicated to the host processor via a suitable bus such as a system management bus, for example. According to another aspect, the values of the measured operational parameters can be displayed on a display that is attached to the memory module. According to another aspect, values of the measured operational parameters can also be displayed on a terminal or screen of the host system by using a user interface application program running on the host processor.

According to yet another aspect, a user can modify operation characteristics of a given memory module by using the user interface application program running on the host processor to send instructions, messages and data to the microcontroller of the given memory module. Such instructions and messages can be sent to the microcontroller using an appropriate bus. For example, an existing system management bus can be used for sending instructions, messages and data to the microcontroller.

According to certain embodiments, the expert memory module has a custom LED-based display that can be used to display memory activity and other parametric data associated with the memory module. According to certain embodiments, the display is visible from the top of the module. According to certain embodiments, functions and applications as described herein may be implemented as hardware, firmware, software or some combination thereof.

Expert memory modules or devices, as described herein, are memory modules which possess intelligence due to the presence of a microcontroller that is associated with each expert memory module. The microcontroller can be built into the expert memory module or otherwise is operationally coupled to the expert memory module. The microcontroller that is associated with each expert memory module can be remotely controlled by a user to collect operational data of the expert memory module. The collection of operational data is described in greater detail herein with reference to FIG. 4. Further, the user can remotely control the microcontroller to modify some of the operational characteristics of the expert memory module. An application program running on the host processor of the target computer (host system) provides a user interface for the communication between the microcontroller and the user. Such an application program running on the host processor of the target computer is also referred to herein as a dashboard utility program and is described in greater detail with reference to FIG. 3 and FIG. 4. The application program communicates the user's instructions and messages to the microcontroller through a suitable bus on the host system, such as a system management bus, for example. The application program is also adapted for obtaining operational data collected by the microcontroller and displaying the collected operational data on a display mechanism on the expert memory module and/or a display screen associated with the host system. The display of the collected operational data on a display unit on the expert memory module is described in greater detail herein with reference to FIG. 2. The display of the collected operational data on display screen is described in greater detail herein with reference to FIG. 3.

FIG. 1 is a high-level block diagram that illustrates a logical architecture for remotely managing an expert memory module in a host system or target computer, according to certain embodiments. FIG. 1 shows expert memory module 102 that is in operative communication with a system management bus 104. Also in communication with system management bus 104 is a host processor 106. Even though FIG. 1 shows a single expert memory module, the embodiments are not limited to one expert memory module. Further, in FIG. 1, expert module 102 includes a microcontroller 108, one or more sensors 110 and optionally, a display unit 112. The microcontroller has an onboard memory and analog-to-digital conversion capability for collecting and displaying operational data of the associated expert memory module. A user can use an application program running on host processor 106 to instruct microcontroller 108 to display collected operational data at display unit 112 or on a display screen (not shown in FIG. 1) that is associated with the host system.

The expert memory module includes one or more sensors, such as sensor 110 in FIG. 1, for measuring operational data of the expert memory module. For example, temperature sensors can be strategically placed at various locations on the expert module in order to measure the temperature gradient on the expert module. The sensors can be built into the expert module's microcontroller, according to certain embodiments. According to other embodiments, the sensors can be external to the microcontroller. There may exist an appreciable temperature gradient across the expert memory module due to the orientation of the expert memory module with respect to active cooling systems in the host system. For example, the parts of the expert memory module that are adjacent to a heat sink or that are in the direct path of an air stream from a fan installed in the host system tend to be cooler that those parts of the expert memory module that are more remote from active cooling systems present in the host system.

Memory modules, such as expert memory module 102 of FIG. 1, reside on the system management bus (SM bus), such as system management bus 104 of FIG. 1, so that the associated Serial Presence Detect (SPD) values can be read by the host system. The SPD of the expert memory modules logically resides on the SM bus at addresses determined by the host system implementation. There are 128 bytes of data (bytes 0 through 127) associated with the standard memory module SPD. The expert modules reside at the same SM bus address as the SPD. However, the data that is specific to the expert module or expert-specific data resides "above" the SPD data, starting at byte 128, according to certain embodiments. Thus, the SM bus is a convenient bus for communication between the user and the microcontroller associated with the expert module. The SPD data are within the flash memory of the microcontroller, rather than in a separate device, according to certain embodiments.

In addition to other motherboard management functions, the system management bus is used to read SPD values including the expert-specific data that resides "above" the SPD data, according to certain embodiments. The registers associated with the expert memory modules are herein referred to as expert registers. A sample memory map for the expert registers ("XPRs") is shown in Table 1, herein. The embodiments are not restricted to the mapping shown in Table 1.

TABLE 1

Sample XPR Register Map

| BYTE | Name | Description |
|---|---|---|
| 128 | Reverse | 0=Normal 1=Reverse |
| 129 | Msg1Len | Message Length in Bytes |
| 130 | Msg2Len | Message Length in Bytes |
| 131 | Msg3Len | Message Length in Bytes |
| | Next 12 byte pairs represent display output options | |
| 132 | 1 DispMsg | ;Display Message Options determine |
| 133 | 1 Duration | ;what built-in data or what user |
| 134 | 2 DispMsg | :data is displayed. The following |
| 135 | 2 Duration | ;values for DispMsg are currently |
| 136 | 3 DispMsg | ;defined: |
| 137 | 3 Duration | ;  0 - Voltage |
| 138 | 4 DispMsg | ;  1 - Temp F. |
| 139 | 4 Duration | ;  2 - Temp C. |
| 140 | 5 DispMsg | ;  3 - Frequency |
| 141 | 5 Duration | ;  4 - POST - not supported |
| 142 | 6 DispMsg | ;  5 - Power - not supported |
| 143 | 6 Duration | ;  6 - Latency |
| 144 | 7 DispMsg | ;  7 - User Message 1 |
| 145 | 7 Duration | ;  8 - User Message 2 |
| 146 | 8 DispMsg | ;  9 - User Message 3 |
| 147 | 8 Duration | ;  10 - Current (not supported) |
| 148 | 9 DispMsg | ;  240 - Version |
| 149 | 9 Duration | ;  241 - Corsair Msg. |
| 150 | 10 DispMsg | ;  255 - Nothing - marker for |
| 151 | 10 Duration | ;  end of message list. |
| 152 | 11 DispMsg | ; |
| 153 | 11 Duration | ; |
| 154 | 12 DispMsg | ; |
| 155 | 12 Duration | ; |
| 156 | Volts High Byte | |
| 157 | Volts Low Byte | ; Conversion: 0.01 V/count |
| 158 | TempC High Byte | |
| 159 | Temp C Low Byte | ; Conversion: 0.01 C/count |
| 160 | Temp F High Byte | |
| 161 | Temp F Low Byte | ; Conversion: 0.01 F/count |
| 162 | Freg High Byte | |
| 163 | Freg Low Byte | ; Conversion: 0.01 MHz/count |
| 164 | POST High Byte | not supported |
| 165 | POST Low Byte | not supported |
| 166 | Power High Byte | |
| 167 | Power Low Byte | ; Conversion: 0.01 W/count (not supported) |
| 168 | MS0 High Byte | |
| 169 | MS0 Low Byte | ; Conversion: 0.01 MHz/count |
| 170 | MS1 High Byte | |
| 171 | MS0 Low Byte | ; Conversion: 0.01 MHz/count |
| 172-195 | Message 1 | ; Message terminated with a zero value. |
| 196-219 | Message 2 | ; Message terminated with a zero value. |
| 220-243 | Message 3 | ; Message terminated with a zero value. |
| 244 | Current High Byte | |

TABLE 1-continued

Sample XPR Register Map

| BYTE | Name | Description |
|---|---|---|
| 245 | Current low Byte | ; Conversion: 0.01 A/count (not supported) |
| 246 | Decimal point | ; Bit-0: Decimal point for voltage |
|  |  | ; Bit-1: Decimal point for temperature |
|  |  | ; Bit-2: Decimal point for frequency |
|  |  | ; Bit-3: Decimal point for power (not supported) |
|  |  | ; Bit-4: Decimal point for current (not supported) |
|  |  | ; 0 for one DP and 1 for two DP's |
| 247-253 | Reserved |  |
| 254 | Check sum high-not used |  |
| 255 | Check sum low-not used |  |

In Table 1, "Display Order" bytes indicate the sequence in which parameters are to be displayed. The value of "Duration" bytes represents the length of time that the parameter is displayed, in tenths of a second (i.e., a value of 32, or 20 hex, would be 3.2 seconds), for example.

The following definitions of duration are merely non-limiting examples. Duration definitions can vary from implementation to implementation.

D7-4:
1) shift speed if character count>10, 0.1 sec per bit (0 to 1.6 sec). 0 means that this message option is not to be displayed. Scrolled messages will begin with the first character appearing on the right most segment and ending when the last character scrolls off the end of segment no. 1, for the 0=Normal option.
2) static display time if character count<=10, which is also the case for all non-message displays. 0.5 sec per bit (0 to 7.5 sec). 0 means that this message option is not to be displayed.

D3-0:
For blank display times after each message, with 0.1 sec increments (0 to 1.5 sec).

In order to minimize storage and improve operation of the expert memory module, the values in the expert registers are expressed using a custom character set ("XPR Characters") rather than ASCII, according to certain embodiments. A non-limiting example of a custom expert register character set is described in Table 2, herein. The embodiments are not restricted to the character set in Table 2.

TABLE 2

Sample XPR Character Set

| Code | Symbol |
|---|---|
| 0 | End of String |
| 1 | 0 |
| 2 | 1 |
| 3 | 2 |
| 4 | 3 |
| 5 | 4 |
| 6 | 5 |
| 7 | 6 |
| 8 | 7 |
| 9 | 8 |
| 10 | 9 |
| 11 | A |
| 12 | B |
| 13 | C |
| 14 | D |
| 15 | E |

TABLE 2-continued

Sample XPR Character Set

| Code | Symbol |
|---|---|
| 16 | F |
| 17 | G |
| 18 | H |
| 19 | I |
| 20 | J |
| 21 | K |
| 22 | L |
| 23 | M |
| 24 | N |
| 25 | O |
| 26 | P |
| 27 | Q |
| 28 | R |
| 29 | S |
| 30 | T |
| 31 | U |
| 32 | V |
| 33 | W |
| 34 | X |
| 35 | Y |
| 36 | Z |
| 37 | " |
| 38 | # |
| 39 | $ |
| 40 | % |
| 41 | & |
| 42 | ' (right) |
| 43 | ( |
| 44 | ) |
| 45 | * |
| 46 | + |
| 47 | , |
| 48 | - |
| 49 | . |
| 50 | / |
| 51 | < |
| 52 | = |
| 53 | > |
| 54 | ? |
| 55 | \ |
| 56 | _ |
| 57 | ' (left) |
| 58 | @ |
| 59 | ± |
| 60 | Space |
| >60 | Not defined |

Figure 2:
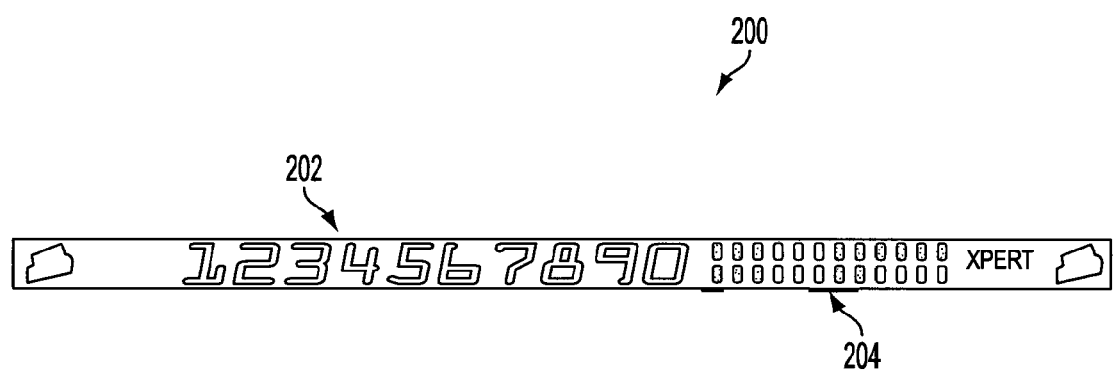
FIG. 2 is a diagram that illustrates a display unit 200, according to certain embodiments.

Code = 0 is for end of string
Code = 1~10 for numeric numbers 0~9
Code = 11~36 for capital letters A~Z
Code = 37~60 for other symbols FIG. 2 is a diagram that illustrates a display unit 200, according to certain embodiments. Display unit 200 is mounted on the top edge of the expert memory module, according to certain embodiments. Users with windowed computer cases are able to view the display unit through the case window. On the other hand, users with windowless cases are able to view expert memory module activity and data on the primary display running on the host system. The primary display, like the display unit 200, is configured using a dashboard utility program that is described in greater detail with reference to FIG. 3 and FIG. 4, herein. In addition, the display unit can be removed and cable-connected to the expert module.

Display unit 200 includes a "text" section 202 and an "activity" section 204, according to certain embodiments. Display unit 200 can be implemented using a custom LED assembly, and is used to display memory-related operational data, also referred to herein as memory-related information or memory operational parameters. The embodiments are not limited to two sections in the display unit and thus can vary from implementation to implementation.

Text section 202 can be configured as a ten digit alphanumeric display, according to certain embodiments. Each digit comprises 14 segments, for example. Text section 202 can be used to scroll through user-defined text messages, also known as the memory module marquee.

Activity section 204 includes two rows of twelve colored LEDs, according to certain embodiments. Certain other embodiments may include more than or less than two rows. Such LEDs are used to display memory activity in bar-graph form, for example. Activity section 204 may also be used to display a variety of other parameters associated with the expert memory module.

The following memory-related parameters are measurable and displayable by the expert memory modules. Such parameters are displayable on either or both the on-module display unit and the memory dashboard utility display interface. The embodiments are not limited to the following list of memory-related parameters.

1) Activity:
LEDs are used to create a display of memory activity of the expert memory module.
2) Voltage:
The display unit and/or the memory dashboard utility display interface can display the supply voltage measured on the expert memory module's power supply planes. In addition to measuring the supply voltage, the reference voltage may also be measured and displayed.
3) Temperature:
The display unit and/or the memory dashboard utility display interface can display the current ambient temperature as measured on the expert memory module. There may be multiple temperature sensors installed at different locations on the expert memory module. Thus, there may be displayed a temperature value corresponding to each temperature sensor.
4) Operating Frequency:
The display unit and/or the memory dashboard utility display interface can display the measured operating frequency of the expert memory module.
5) Memory Part Number and Latency Information:
The display unit and/or the memory dashboard utility display interface can display the expert memory module part number and the key parameters stored in the SPD (serial presence detect) of the expert memory module. If the target or host system is one that the dashboard utility program is capable of reading the latency values directly from the chip set, these actual values will be displayed in addition to those from the SPD.

The expert memory module allows the expert memory module's SPD to be read just as if the module were a standard DIMM. The registers (XPRS) associated with the expert memory module are read using the system management bus "Read Byte" commands, according to certain embodiments. The XPRs are written using the system management bus "Write Byte" commands, according to certain embodiments.

As previously described with reference to FIG. 1, the user can use an application program (memory dashboard utility program) running on host processor 106 of the host system to instruct microcontroller 108 to display collected operational data at display unit 112 and/or at a primary display screen on the host system. The memory dashboard utility includes a user interface that operates similar to a dialog box (e.g., Windows dialog box), according to certain embodiments. The user can choose new options and or modify values, and then select an "Apply" or "OK" button of the dialog box. The user is also able to control the display configuration, marquee text, etc., using the memory dashboard utility, according to certain embodiments.

The memory dashboard utility program polls the expert memory module for Voltage, Temperature, Frequency, and Power values, for example, on a repeating basis. For example, the default period for polling can be once per sixty seconds. The period for polling is programmable from the memory dashboard utility. Automatic updates of memory module information for display can be disabled by the user, if so desired, to avoid drawing system resources from high performance applications.

Figure 3:
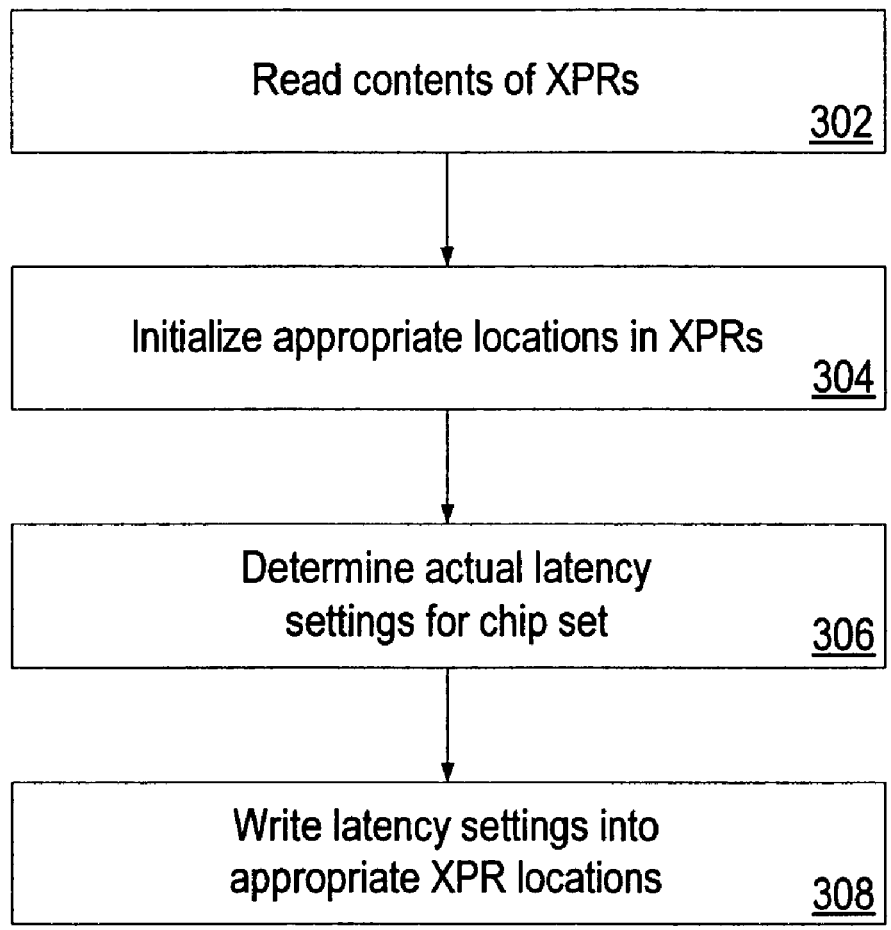
FIG. 3 is a high-level flow chart that illustrates some of the functions performed by the memory dashboard utility program when the memory dashboard utility is launched, according to certain embodiments.

FIG. 3 is a high-level flow chart that illustrates some of the functions performed by the memory dashboard utility program when the memory dashboard utility is launched, according to certain embodiments.

At block 302, the memory dashboard utility program reads the contents of the XPRs for each expert memory module in the system. At block 304, the memory dashboard utility program initializes the appropriate locations in the XPRs with values (such as marquee, display order and duration, etc. stored by the memory dashboard utility). At block 306, the memory dashboard utility program determines actual latency settings for the chip set. At block 308, the memory dashboard utility program writes the actual latency settings into the appropriate XPR locations.

Figure 4:
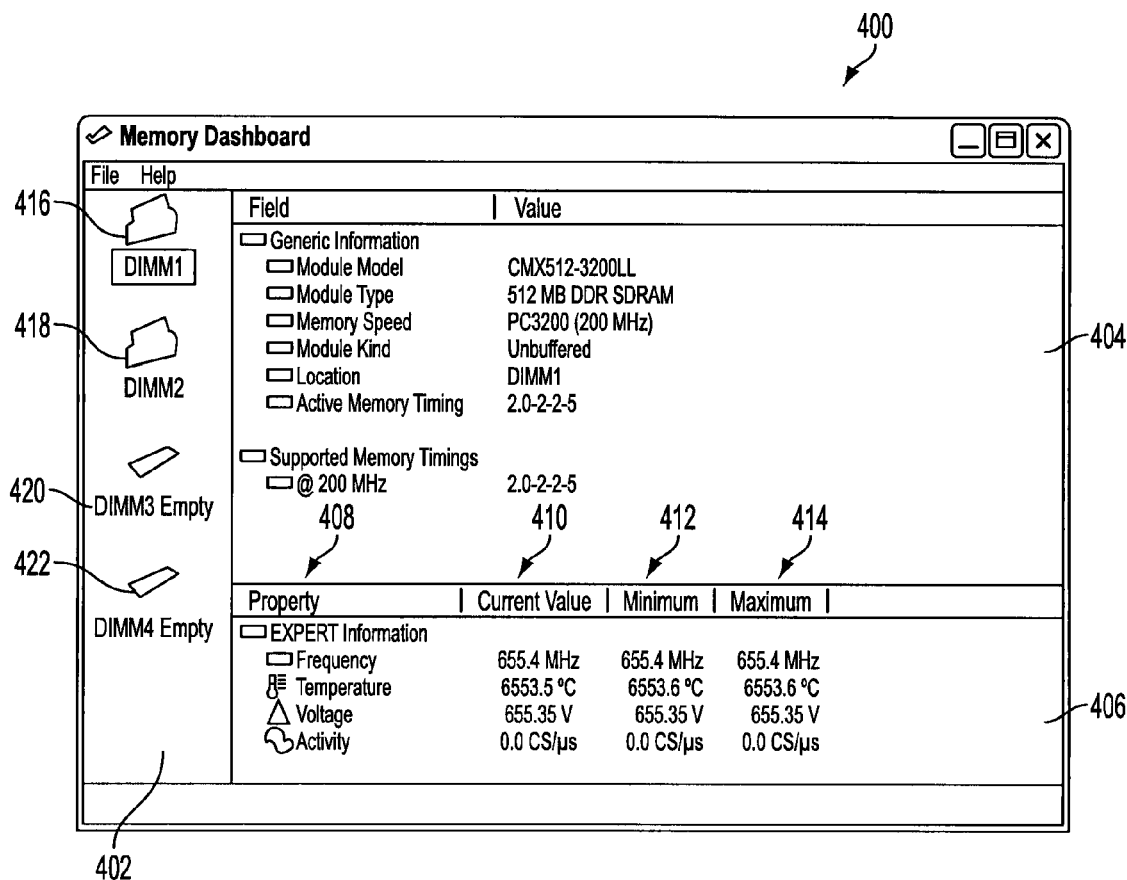
FIG. 4 is a block diagram that illustrates a graphical user interface of the memory dashboard utility program, according to certain embodiments.

FIG. 4 is a block diagram that illustrates a graphical user interface of the memory dashboard utility program as described with reference to FIG. 1, herein. FIG. 4 shows screen shot 400 that includes a selection pane 402, a general information pane 404 and an "expert" pane 406. The memory dashboard utility interface shows a snapshot view of the memory-related parameters, such as memory activity, voltage, temperature, and SPD information, as described above.

Selection pane 402 shows memory modules such as modules 416 and 418 that exist in the host system. Selection pane 402 also shows available memory slots or sockets 420 and 422. There is a separate display page for each memory module within the system, but only one is displayed at one time, according to certain embodiments. The user selects a memory module for display by clicking on a memory icon in the selection pane 402, for example.

General information pane 404 displays information from the memory module's SPD, such as part number and other generic module information, for example.

The expert pane 406 shows a readout that includes a current value 410, a minimum value 412, and a maximum value 414 for properties 408 such as Activity, Voltage, Operating Frequency, and Temperature, according to certain embodiments. The user can configure the dashboard utility to display other memory-related properties or parametric data. The expert pane 406 also displays the current text marquee value for the selected module. The user can control and modify the text marquee value via the dashboard utility program.

For non-expert modules, the "expert" pane of the display can display a message stating, "The module in this socket is not an expert Module", for example.

The memory dashboard is accessible by way of an icon in the operating system Taskbar, as well as through the operating system start menu, according to certain embodiments. The display can be made as compact as possible, depending on the implementation.

An Options dialog is available, which allows the user to set the processing priority, define/revise the text marquee contents, control the speed at which the text is scrolled, and specify what parameters are displayed on the module, in what order, and for what duration, according to certain embodiments. The options dialog is individually available for each expert module in the system. User defined operation settings remain persistent after the host computer is restarted or turned off. The user defined operation settings are stored by the memory dashboard utility, rather than by the module's firmware, according to certain embodiments.

The memory dashboard utility may have an "About" button or menu option, which display copyright information and version number, according to certain embodiments.

Application priority can also be set, to allow the memory dashboard utility to run in the background while games or other demanding applications are being run on the host system, according to certain embodiments.

User settings are "persistent" from session to session. Due to memory architecture, the user settings are stored in RAM (rather than Flash) during operation on the expert memory module itself, according to certain embodiments. Therefore, a "settings" file is created and maintained by memory dashboard utility program. It is a text-only file, with settings for each module present in the system, according to certain embodiments. The settings file can be updated every time the module is updated with new settings, according to certain embodiments.

At power-up, the expert module executes a sequence of diagnostics, as follows:
All LEDs are illuminated for three seconds, for example.
The time period of illumination can vary from implementation to implementation.
The module goes into Default Operation.
The expert modules can be shipped with the default operation enabled, according to certain embodiments. When configured for default operation, the memory module will sequence its display as in the following example:
Measured clock speed, 2 seconds
Voltage, 2 seconds
Temperature, 2 seconds
Scrolling text, module part number from SPD, 2 seconds
"Expert series" will scroll on the text display for 3 seconds.
The operating mode of an expert memory module defines how parameters are displayed on the expert module display. The expert memory module can be configured to scroll through as many or as few parameters as defined by the user using the memory dashboard utility program. Mode configuration is stored by the dashboard utility program, and can be individually configured for each expert memory module in the system, according to certain embodiments.

Further, the memory dashboard utility program can be used to control the operational characteristics of the expert memory module, according to certain embodiments. In one non-limiting example, the user can use the memory dashboard utility program to send instructions to the microcontroller on the expert memory module to boost the operating voltage of the expert memory module in order to effect overclocking. In another non-limiting example, the user can use the memory dashboard utility program to send instructions to the microcontroller to modify the phase offset of a phase lock loop of the expert memory module.

In the foregoing specification, embodiments of the invention have been described with reference to numerous specific details that may vary from implementation to implementation. The specification and drawings are, accordingly, to be regarded in an illustrative rather than a restrictive sense.

We claim:

1. A method for managing a memory device, the method comprising:
    using a plurality of sensors on said memory device;
    using a microcontroller in association with said memory device, wherein said microcontroller is adapted for remote modification of operation characteristics of said memory device and for remote collection of information from said memory device;
    communicating with said microcontroller for said remote modification and said remote collection using an available memory space of a corresponding serial presence detect device that is associated with said memory device; and
    using said information collected from said memory device for displaying on a display unit on said memory device, wherein said display unit on said memory device is an LED assembly that comprises a text section display and an activity section display.

2. A method for managing a memory device, the method comprising:
    using a plurality of sensors on said memory device;
    using a microcontroller in association with said memory device, wherein said microcontroller is adapted for remote modification of operation characteristics of said memory device and for remote collection of information from said memory device;
    communicating with said microcontroller for said remote modification and said remote collection using an available memory space of a corresponding serial presence detect device that is associated with said memory device;
    using said information collected from said microcontroller of said memory device for displaying on a user interface on a host computer that is associated with said memory device, wherein said user interface includes a dashboard utility for displaying a snapshot view of said information collected from said microcontroller of said memory device, and wherein said dashboard utility is adapted for displaying a separate display page for each memory device associated with said host computer.

3. A method for managing a memory device, the method comprising:
    using a plurality of sensors on said memory device;
    using a microcontroller in association with said memory device, wherein said microcontroller is adapted for remote modification of operation characteristics of said memory device and for remote collection of information from said memory device;
    communicating with said microcontroller for said remote modification and said remote collection using an available memory space of a corresponding serial presence detect device that is associated with said memory device;

using said information collected from said microcontroller of said memory device for displaying on a user interface on a host computer that is associated with said memory device, wherein said user interface includes a dashboard utility for displaying a snapshot view of said information collected from said microcontroller of said memory device, and, wherein said dashboard utility is adapted for providing an options dialog for allowing a user to set processing priority, define one or more text messages, select one or more memory device operation parameters for display on a display unit attached to said memory device, and configure a manner of display of said one or more text messages and said one or more operation parameters for each memory device associated with said host computer.

* * * * *